United States Patent
Pead

(10) Patent No.: US 10,708,319 B2
(45) Date of Patent: Jul. 7, 2020

(54) METHODS AND APPARATUS FOR PROVIDING SOCIAL VIEWING OF MEDIA CONTENT

(71) Applicant: DISH TECHNOLOGIES LLC, Englewood, CO (US)

(72) Inventor: Scott Pead, Englewood, CO (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

(21) Appl. No.: 14/145,025

(22) Filed: Dec. 31, 2013

(65) Prior Publication Data

US 2014/0189540 A1 Jul. 3, 2014

Related U.S. Application Data

(60) Provisional application No. 61/747,583, filed on Dec. 31, 2012.

(51) Int. Cl.
| | |
|---|---|
| G06F 3/048 | (2013.01) |
| H04L 29/06 | (2006.01) |
| G06F 3/0484 | (2013.01) |
| G06Q 10/10 | (2012.01) |
| G06Q 50/00 | (2012.01) |

(52) U.S. Cl.
CPC .......... *H04L 65/403* (2013.01); *G06F 3/0484* (2013.01); *G06Q 10/10* (2013.01); *G06Q 50/01* (2013.01)

(58) Field of Classification Search
CPC .. H04N 21/4788; G06F 17/3082; G06F 17/24
See application file for complete search history.

(56) References Cited

U.S. PATENT DOCUMENTS

| | | | |
|---|---|---|---|
| 5,935,206 | A | 8/1999 | Dixon et al. |
| 6,195,680 | B1 | 2/2001 | Goldszmidt et al. |
| 6,973,081 | B1 | 12/2005 | Patel |
| 7,474,832 | B2 | 1/2009 | Boston et al. |
| 7,584,495 | B2 | 9/2009 | Hannuksela et al. |
| 7,603,022 | B2 | 10/2009 | Putterman et al. |
| 7,624,412 | B2 | 11/2009 | McEvilly et al. |
| 7,739,239 | B1 | 6/2010 | Cormie et al. |

(Continued)

FOREIGN PATENT DOCUMENTS

| | | |
|---|---|---|
| WO | 2007030813 A2 | 3/2007 |
| WO | 2009035466 A1 | 3/2009 |

(Continued)

OTHER PUBLICATIONS

U.S. Patent and Trademark Office, Notice of Allowance, dated May 23, 2014 for U.S. Appl. No. 13/707,044.

(Continued)

*Primary Examiner* — Haoshian Shih
(74) *Attorney, Agent, or Firm* — Lorenz & Kopf LLP

(57) ABSTRACT

A method for social viewing of media content includes transmitting, to multiple users, media content when the multiple users are members of a common group associated with a social media site (i.e., "friends" or the like) while providing, to the users, an interaction region configured to allow the first user and the second user to share comments with each other regarding the media content via an interaction stream.

12 Claims, 4 Drawing Sheets

(56) References Cited

U.S. PATENT DOCUMENTS

| | | | |
|---|---|---|---|
| 7,770,200 | B2 | 8/2010 | Brooks et al. |
| 8,181,206 | B2 | 5/2012 | Hasek |
| 8,238,725 | B2 | 8/2012 | Demas et al. |
| 8,681,680 | B2 | 3/2014 | Mao et al. |
| 8,787,975 | B2 | 7/2014 | Kanojia et al. |
| 8,990,328 | B1* | 3/2015 | Grigsby ............ H04L 12/1845 709/203 |
| 2002/0046405 | A1 | 4/2002 | Lahr |
| 2003/0208767 | A1 | 11/2003 | Williamson et al. |
| 2005/0002337 | A1 | 1/2005 | Wang et al. |
| 2005/0191033 | A1 | 9/2005 | Ishido |
| 2005/0233694 | A1 | 10/2005 | Enari et al. |
| 2005/0289618 | A1 | 12/2005 | Hardin |
| 2006/0020984 | A1 | 1/2006 | Ban et al. |
| 2006/0053078 | A1 | 3/2006 | Yamamoto et al. |
| 2006/0117090 | A1 | 6/2006 | Schellingerhout et al. |
| 2007/0036516 | A1 | 2/2007 | Kahn et al. |
| 2007/0107019 | A1 | 5/2007 | Romano et al. |
| 2007/0118857 | A1 | 5/2007 | Chen et al. |
| 2007/0124245 | A1 | 5/2007 | Sato et al. |
| 2008/0013919 | A1 | 1/2008 | Boston et al. |
| 2008/0092168 | A1 | 4/2008 | Logan et al. |
| 2008/0127284 | A1 | 5/2008 | Kouniniotis |
| 2008/0201748 | A1 | 8/2008 | Hasek et al. |
| 2008/0310825 | A1 | 12/2008 | Fang et al. |
| 2009/0074380 | A1 | 3/2009 | Boston et al. |
| 2009/0080582 | A1 | 3/2009 | Loeffler et al. |
| 2009/0080864 | A1 | 3/2009 | Rajakarunanayake |
| 2009/0125464 | A1* | 5/2009 | Shi .................. H04N 7/163 706/14 |
| 2009/0144285 | A1 | 6/2009 | Chatley et al. |
| 2010/0070858 | A1* | 3/2010 | Morris ............... H04N 5/445 715/706 |
| 2010/0114921 | A1 | 5/2010 | Bocharov et al. |
| 2010/0138756 | A1* | 6/2010 | Saund ............ H04L 12/1827 715/758 |
| 2010/0153237 | A1 | 6/2010 | Lajoie et al. |
| 2010/0250549 | A1 | 9/2010 | Muller et al. |
| 2010/0306655 | A1* | 12/2010 | Mattingly ............ G06Q 10/10 715/720 |
| 2010/0319044 | A1 | 12/2010 | Agans et al. |
| 2011/0035507 | A1 | 2/2011 | Brueck et al. |
| 2011/0083144 | A1 | 4/2011 | Bocharov et al. |
| 2011/0138431 | A1 | 6/2011 | Cedervall et al. |
| 2011/0173345 | A1 | 7/2011 | Knox et al. |
| 2011/0179385 | A1* | 7/2011 | Li ..................... G06F 17/3082 715/810 |
| 2011/0188439 | A1 | 8/2011 | Mao et al. |
| 2011/0225315 | A1 | 9/2011 | Wexler et al. |
| 2011/0246908 | A1* | 10/2011 | Akram .......... H04N 21/234318 715/752 |
| 2011/0296048 | A1 | 12/2011 | Knox et al. |
| 2012/0054312 | A1 | 3/2012 | Salinger |
| 2012/0079546 | A1 | 3/2012 | Kalidindi et al. |
| 2012/0144302 | A1 | 6/2012 | Campanotti et al. |
| 2012/0174157 | A1* | 7/2012 | Stinson, III ........ H04N 5/44543 725/40 |
| 2012/0265806 | A1* | 10/2012 | Blanchflower ........ G06Q 10/10 709/204 |
| 2012/0293605 | A1 | 11/2012 | Seferian et al. |
| 2012/0317655 | A1 | 12/2012 | Zhang et al. |
| 2012/0324489 | A1 | 12/2012 | Greenfield |
| 2012/0331106 | A1 | 12/2012 | Ramamurthy et al. |
| 2013/0013688 | A1 | 1/2013 | Wang et al. |
| 2013/0013704 | A1 | 1/2013 | Pope et al. |
| 2013/0089142 | A1 | 4/2013 | Begen et al. |
| 2013/0097309 | A1 | 4/2013 | Ma et al. |
| 2013/0103814 | A1* | 4/2013 | Carrasco ............ H04L 65/4015 709/223 |
| 2013/0111606 | A1 | 5/2013 | Gu |
| 2013/0142499 | A1 | 6/2013 | Major et al. |
| 2013/0145392 | A1 | 6/2013 | Major et al. |
| 2013/0145408 | A1 | 6/2013 | Major et al. |
| 2013/0145410 | A1 | 6/2013 | Major et al. |
| 2013/0145411 | A1 | 6/2013 | Major et al. |
| 2013/0145415 | A1 | 6/2013 | Major et al. |
| 2013/0159544 | A1 | 6/2013 | Cooper |
| 2013/0254341 | A1 | 9/2013 | Ramakrishnan |
| 2013/0254538 | A1 | 9/2013 | Orsini et al. |
| 2014/0067828 | A1* | 3/2014 | Archibong .......... H04L 65/4084 707/748 |
| 2014/0189099 | A1 | 7/2014 | Hurst et al. |
| 2014/0189143 | A1 | 7/2014 | Muhlestein |
| 2014/0237510 | A1* | 8/2014 | Phillips ............. H04N 21/4622 725/34 |
| 2014/0237534 | A1 | 8/2014 | Salinger et al. |
| 2014/0250473 | A1 | 9/2014 | Braness et al. |
| 2014/0317652 | A1 | 10/2014 | Tam |

FOREIGN PATENT DOCUMENTS

| | | | | |
|---|---|---|---|---|
| WO | 2011034955 A2 | | 3/2011 | |
| WO | WO2012/153290 | * | 11/2012 | ............... G06F 3/14 |

OTHER PUBLICATIONS

U.S. Patent and Trademark Office, Notice of Allowance, dated May 27, 2014 for U.S. Appl. No. 13/707,022.

USPTO, "Office Action" dated Aug. 21, 2014 for U.S. Appl. No. 13/706,993.

USPTO, "Notice of Allowance and Fee(s) Due" dated Aug. 25, 2014 for U.S. Appl. No. 13/706,983.

U.S. Patent and Trademark Office, Non-Final Office Action, dated Oct. 9, 2014 for U.S. Appl. No. 13/837,058.

U.S. Patent and Trademark Office, Non-Final Office Action, dated Nov. 3, 2014 for U.S. Appl. No. 13/707,008.

U.S. Patent and Trademark Office, Notice of Allowance, dated Nov. 6, 2014 for U.S. Appl. No. 13/706,983.

USPTO, Notice of Allowance and Fee(s) Due for U.S. Appl. No. 13/707,008 dated Mar. 4, 2015.

The International Bureau of WIPO, International Preliminary Report on Patentability for International Application No. PCT/US2013/078358 dated Jul. 9, 2015.

USPTO, Office Action for U.S. Appl. No. 14/145,115 dated Aug. 21, 2015.

European Patent Office, International Search Report and Written Opinion, dated Apr. 17, 2014 for International Application No. PCt/US2013/078358.

Wikipedia, the free encyclopeida, Adaptive Bitrate Streaming, Sep. 24, 2014; retrieved from the Internet at http://en.wikipedia.org/w/index.php?title=Adaptie_bitrate_streaming@oldid=528192400.

USPTO, Notice of Allowance dated Mar. 4, 2014 for U.S. Appl. No. 13/707,031.

USPTO, Final Office Action dated Mar. 12, 2014 for U.S. Appl. No. 13/707,044.

USPTO, Final Office Action dated Mar. 13, 2014 for U.S. Appl. No. 13/707,022.

USPTO, Non-final Office Action dated Mar. 6, 2014 for U.S. Appl. No. 13/706,983.

Microsoft, How NTFS Works, Mar. 28, 2003, http://technet.microsoft.com/en-us/library/cc781134(v=ws.10).aspx.

T. Berners-Lee, "Hypertext Transfer Protocol—HTTP/1.1," Jun. 1999; retrieved from the Internet on Apr. 10, 2013 from http://www.w3.org/protocols, Chapters 5, 6, and 10.

European Patent Office "International Search Report and Written Opinion" dated Jun. 7, 2013 for International Appln. No. PCT/US2012/067796.

US Patent and Trademark Office, Non-Final Office Action, dated Sep. 13, 2013 for U.S. Appl. No. 13/707,008.

US Patent and Trademark Office, Non-Final Office Action, dated Sep. 20, 2013 for U.S. Appl. No. 13/707,022.

US Patent and Trademark Office, Non-Final Office Action, dated Sep. 25, 2013 for U.S. Appl. No. 13/707,031.

US Patent and Trademark Office, Non-Final Office Action, dated Oct. 2, 2013 for U.S. Appl. No. 13/707,044.

US Patent and Trademark Office, Final Office Action dated Jan. 15, 2014 for U.S. Appl. No. 13/707,008.

(56) References Cited

OTHER PUBLICATIONS

US Patent and Trademark Office, Office Action dated Sep. 10, 2013 for U.S. Appl. No. 13/706,983.
US Patent and Trademark Office, Final Office Action dated Jan. 10, 2014 for U.S. Appl. No. 13/706,983.
USPTO, Notice of Allowance and Fee(s) Due for U.S. Appl. No. 13/837,058 dated Feb. 3, 2015.
USPTO, Notice of Allowance and Fee(s) Due for U.S. Appl. No. 13/706,993 dated Feb. 27, 2015.
USPTO, Final Office Action in U.S. Appl. No. 14/144,235 dated Nov. 25, 2015.

* cited by examiner

METHODS AND APPARATUS FOR PROVIDING SOCIAL VIEWING OF MEDIA CONTENT

CROSS-REFERENCE TO RELATED APPLICATIONS

This application claims priority to U.S. Prov. Pat. Application No. 61/747,583, filed Dec. 31, 2012, the contents of which are hereby incorporated by reference.

TECHNICAL FIELD

The present disclosure generally relates to systems and techniques for processing, viewing, and selecting media content. More particularly, the present disclosure relates to shared viewing of media in the context of social media sites.

BACKGROUND

In recent years, social media sites such as Facebook, Twitter, Google+, and the like have achieved wide popularity. Such sites often allow users to form groups (e.g., "friends", "followers", "circles", etc.) and share information with other users in those groups. At the same time, options for viewing media content have also increased, expanding beyond standard cable television to place-shifting devices, network streaming, and the like. Nevertheless, given the vast amount of media content available, it is often difficult for a user to discover content that he or she might enjoy. Furthermore, it remains difficult for users to share their thoughts regarding media content in a meaningful, social, and enjoyable way.

It is therefore desirable to create systems and methods that provide a social context for shared viewing of media. These and other desirable features and characteristics will become apparent from the subsequent detailed description and the appended claims, taken in conjunction with the accompanying drawings and this background section.

SUMMARY

A method for social viewing of media content in accordance with one embodiment includes transmitting, to a first user, media content via a network; transmitting, to a second user, the media content via the network, wherein the second user and the first user are members of a common group associated with a social media site; and providing, to the first and second users, an interaction region configured to allow the first user and the second user to share comments with each other regarding the media content via an interaction stream.

A system for providing social viewing of media content in accordance with one embodiment includes a media player communicatively coupled to a social media site. The media player is configured to receive media content from a media source. The social media site provides access to a first user and a second user who are members of a common group associated with the social media site, and the social media site provides, to the first and second users, an interaction region configured to allow the first user and the second user to share comments with each other regarding the media content via an interaction stream.

In accordance with another embodiment, non-transitory computer-readable medium bearing software instructions are configured to cause a processor to perform the steps of transmitting, to a first user, media content via a network; transmitting, to a second user, the media content via the network, wherein the second user and the first user are members of a common group associated with a social media site; and providing, to the first and second users, an interaction region configured to allow the first user and the second user to share comments with each other regarding the media content via an interaction stream.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In general, systems and methods in accordance with the subject matter described herein provide a social context (e.g., via a social media site accessible via a network) for shared viewing of media content while allowing comments, annotations, public discussions, etc. relating to the media content to be shared as a group. In addition, notifications that a user is viewing particular media content may be communicated to "friends" to initiate such sharing in a social context.

Figure 1:
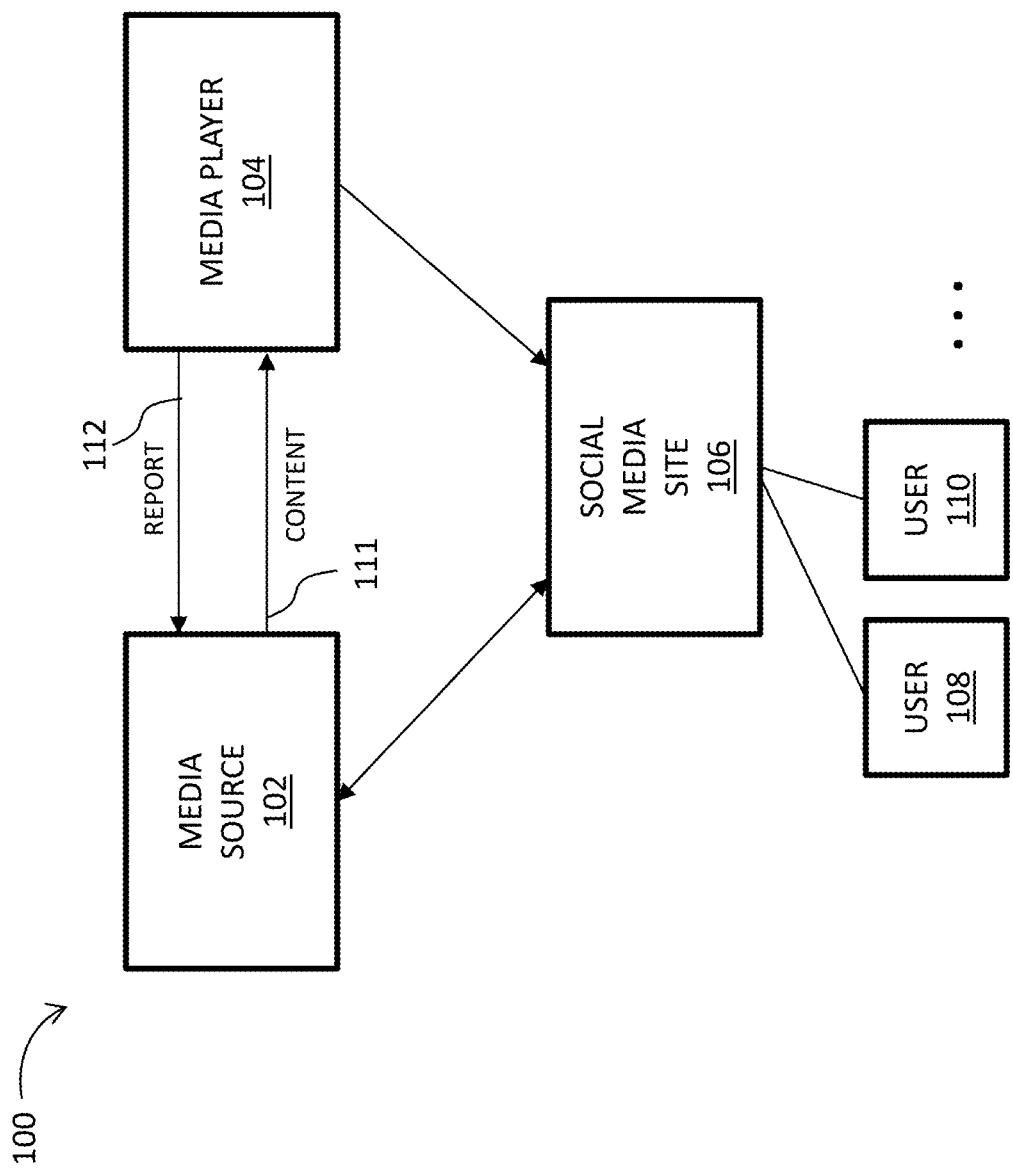
FIG. 1 is a conceptual block diagram of a system in accordance with one embodiment.

Referring now to the conceptual block diagram shown in FIG. 1, a system 100 in accordance with various embodiments generally includes a media source (or simply "source") 102, a media player 104, a social media site 106, and one or more users 108. Media source 102 is communicatively coupled to media player 104 and is configured to provide media content (or simply "content") 111 to media player 104 while receiving information (e.g., a "report" 112) back from media player 104.

Social media site (or simply "site") 106 is communicatively coupled (e.g., via the Internet) to both media source 102 and media player 104. For simplicity, social media site 106 is illustrated as a single block, but those skilled in the art will recognize that social media site 106 might include any number of functional components (servers, processors, databases, etc.) spread out geographically while implementing any number of services (web services, streaming services, etc.). In this regard, "social media site" is used herein in its conventional sense of a system (typically a website accessible via a web browser over the Internet) that allows users 108, 110, etc. to interact with each other in some fashion and to "follow," "friend", or otherwise denote other users as members of a common group associated with the social media site. Without loss of generality, the term "friends" may be used herein generically to refer to users within the same group, circle, friendship, or the like, regardless of whether the mechanism for formation of such groups includes "friending," "following," "placing in a circle," or the like. A non-limiting list of social media sites includes, for example, Google+, Facebook, Twitter, LinkedIn, Pinterest, MySpace, and Foursquare.

Users 108 represent any number of individuals or groups configured to interact with social media site 106 through conventional methods, such as laptops, desktop computers, smart-phones, tablet computers, and the like. In this regard, users 108 will typically have an "account" with social media site 106 such that certain credential are required for logging on and interacting with the site and others on the site.

Media source 102 may include a wide range of sources now known or later developed, including, for example, broadcast television, cable television, satellite television, "video-on-demand" or similar sources, digital video disk (DVD) players and other removable media, video camera systems, video game consoles, set-top box (STB) systems, Internet media sources (e.g., YouTube), and the like. In some embodiments, media source 102 represents a placeshifting device that incorporates all or a portion of the functionality typically associated with a particular media source 102, for example: a hybrid STB or other receiver that provides transcoding and placeshifting features. Such a device may receive satellite, cable, broadcast and/or other signals that encode television programming or other content received from an antenna, modem, server and/or other source. Such devices may also include a content database to support a personal or digital video recorder (DVR) feature or other content library as appropriate. Stated another way, in some embodiments, media source 102 and a placeshifting device are physically and/or logically contained within a common component, housing or chassis.

Media player 104 may be any device, component, module, hardware, software and/or the like capable of receiving a media stream (or "content") from media source 102. In various embodiments, media player 104 is a desktop computer, a laptop computer, a tablet computer, a mobile phone, a personal digital assistant, a personal media player (such as the ARCHOS products available from the Archos company of Igny, France), a conventional television, or the like. In many embodiments, media player 104 is a general purpose computing device that includes a media player application that is capable of securely connecting to media source 102 and receiving and presenting media content to the user of the device as appropriate. In other embodiments, media player 102 is a standalone or other separate hardware device capable of receiving the media stream and decoding the media stream to provide an output signal that is presented on a television or other display device.

It will be appreciated that the various blocks illustrated in FIG. 1 will typically include a number of additional conventional hardware and/or software components (e.g., storage, memory, controllers, digital signal processors, etc.), which have been left out of the illustration in the interest of simplicity. For example, media source 102 might include hardware that incorporates an encoder and/or transcoder module configured to convert audio/video or other data from into a packetized format that can be transmitted over a network. Media player 104 is configured to provide commands and or to report to one or more of the media sources 102, e.g., to request a desired input signals from that media source. Such commands may be provided over any convenient wired or wireless interface, such as an infrared or other wireless transmitter that emulates remote control commands receivable by the media source 102.

Figure 2:
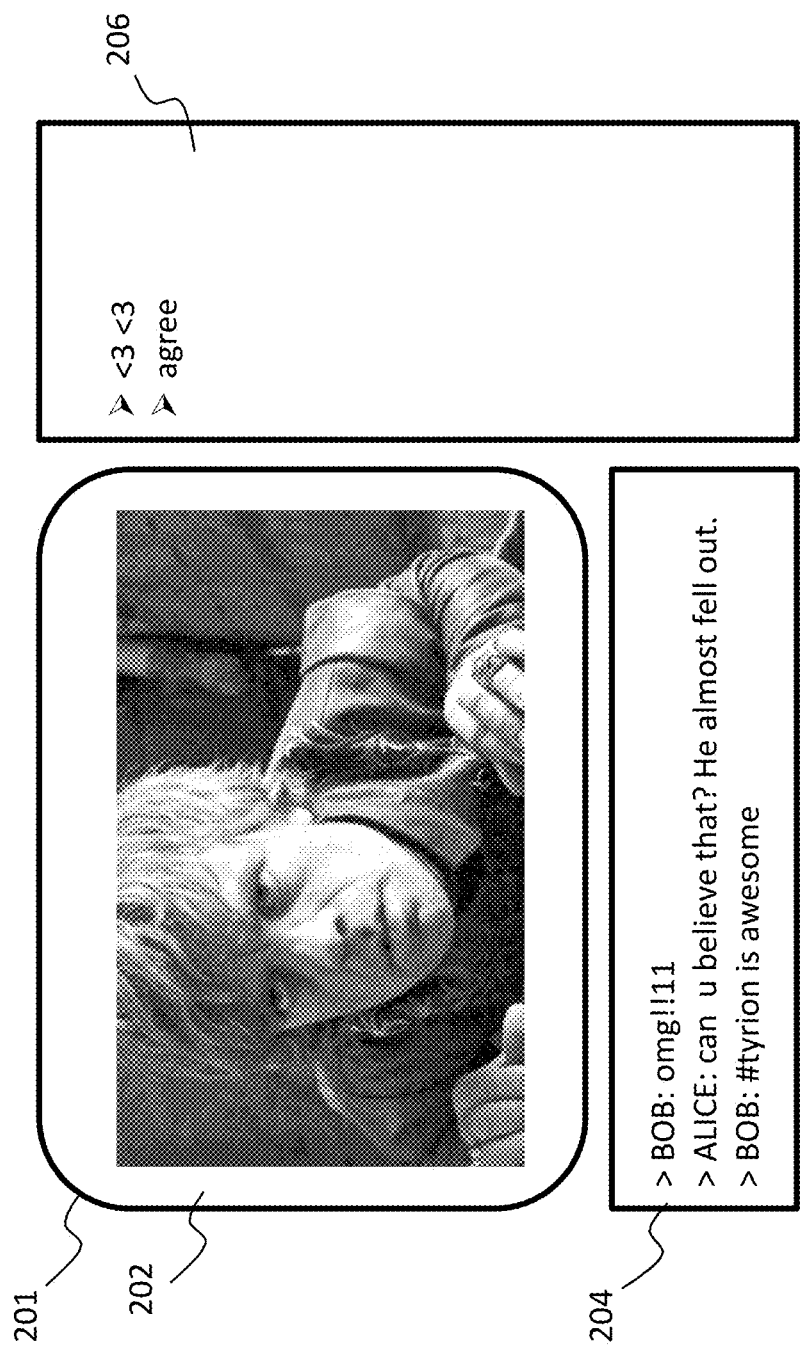
FIG. 2 is a conceptual representation of a shared viewing experience in accordance with one embodiment.
Figure 3:
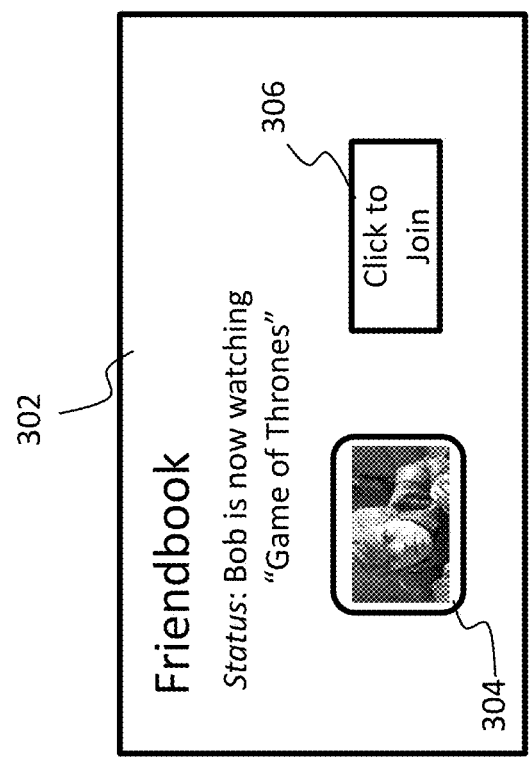
FIG. 3 is a conceptual view of a status update in accordance with one embodiment.

In accordance with various embodiments, users 108 and 110 are able to view certain media content together (via social media site 106) and comment, annotate, or otherwise share information regarding that media content. Referring now to FIGS. 2 and 3 in conjunction with FIG. 1, an example of such an interaction will now be described.

FIG. 2 depicts a media content region 201 in which certain media content 202 (e.g., streamed video, audio, etc.) is provided along with an associated interaction region 204 as those regions might appear displayed within, for example, a conventional web browser window or via any display coupled to media player 104. As shown, interaction region 204 allows multiple users (in this example, "Bob" and "Alice") to comment and interact in real-time (or at different times) as media content 202 is viewed by the users. The resulting discussion is referred to as the "interaction stream."

In this example, the user providing the comment is provided in the text stream (or "chat stream") within interaction region 204. In some embodiments, time-stamps relating to a position within media content 202 may be provided. In various embodiments, users may share within interaction region 204 annotations, observations, comments, links to external sites (e.g., websites relating to a particular show), hashtags (i.e., keywords relating to a subject, event, etc.) relating to the content, and the like.

Comments, text, links, images, and other content provided by users 108 and/or 110 (entered via a keyboard or other user input method) are received by social media site 106 (e.g., via the Internet) along with media content from source 102 and/or media player 104. Social media site 106 then combines the two as shown in FIG. 2. At any given moment, one user might view media content received from media source 102, while another views the same media content from media player 104. That is, the ultimate source of the media content 202 might be invisible to the users. In other embodiments, users may select the media source to be used.

Multiple users may view and comment on media content image 202 in real-time, or may do so at a later time or date. In the case of delayed viewing, comments made by one or more friends at certain previous times may be stored and displayed at the appropriate time—i.e., synched with media content 202.

In the illustrated embodiment, media content region 201 is shown directly adjacent and above interaction region 204; however, the invention is not so limited, and any convenient layout scheme for the various regions may be employed. An aggregated or composite display as shown in FIG. 2 might be implemented using a variety of software environments, including, for example, HTML5/CSS/Javascript, and may be created client-side (e.g., within the user's browser), server-side (e.g., at social media site 106), or a combination thereof.

Report 112 includes information communicated by media player 104 to media source 102 for the purpose of, for example, reporting that a particular user is watching or has watched particular media content. Report 112 might also be shared with other entities, such as social media site 106 or other external sites.

In some embodiments, users may be able to simultaneously view interactions and discussions occurring within additional social media sites (i.e., social media sites external to social media site 106). For example, a Twitter stream or other social media stream 206 relating to the viewed media image may also be displayed in addition to media content image 202 and interaction region 204, as shown in FIG. 2. This stream 206 may be determined, for example, by the content displayed within interaction region 204. That is, social media site may determine, through analysis of the content of interaction region 204 (including text, hashtags, links, etc.) that certain comments (e.g., "tweets", ads, or the like) within stream 206 might be of interest to one or more of the users viewing media content 202. Stream 206 might appear the same for all users viewing media content region 202, or may different, depending upon user-preference or other factors.

In some embodiments, the friends of a user may be notified that the user is currently (or had previously) viewed particular media content, which may be presented individually or as a list. The notification may be initiated, for example, by media player 104, source 102, social media site 106, or any other component or system that is able to determine which user is viewing which content and to report such viewing to social media site 106.

FIG. 3 generally depicts such a notification 302, in which a status message is displayed ("Bob is now watching 'Game of Thrones'") on social media site 106, indicating the media content being viewed and the friend (or friends) currently viewing that content. The friend is then provided a mechanism (e.g., any suitable user interface component, such as button 306) to join the conversation. A thumbnail image 304 (corresponding to a still from the media content, or corresponding to media content 202 of FIG. 2) may also be provided, which may be static or may change in real-time based on what the user is currently viewing.

The user interfaces associated with the embodiments shown in FIGS. 2 and 3 and indeed any other embodiments may include any number of conventional and well known user interface components (menu items, lists, buttons, check-boxes, and the like), and may be implemented using any suitable computer libraries/languages (e.g., HTML/CSS/JS, Macromedia Flash, a Facebook Widget, or the like). The invention is not so limited, however.

Since social media site 106 will generally know and store (e.g., within a conventional data store) the shared interests, preferences, "likes," "topical hotspots", etc. of users 108 and 110, it can provide notifications to a user's friends based on these common interests. For example, social media site 106 may know that a user Alice is generally interested in the fantasy novel genre, and that "Game of Thrones" generally fits within this genre. As a result, the system may send a notification to Alice letting her know that Bob is currently watching (or had previously watched) that show.

Figure 4:
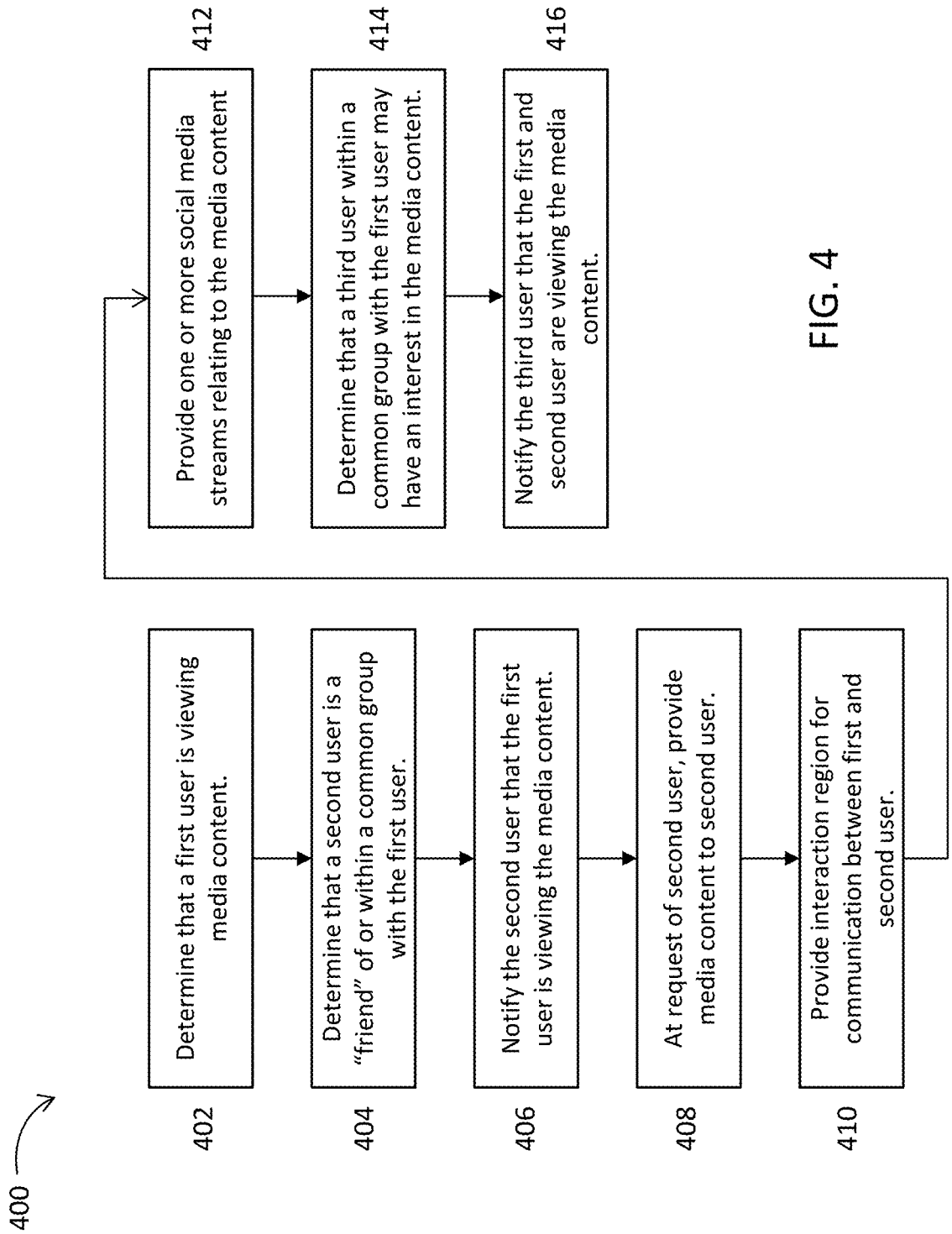
FIG. 4 is a flow chart depicting a method in accordance with one embodiment.

The flow-chart of FIG. 4 provides a single example, or use-case, in which the present invention may be employed. As shown, method 400—which is described from the point-of-view of social media site 106—begins with a determination that a first user is viewing media content (402). As a non-limiting example, consider the case where the first user, Bob, has begun to watch a particular episode of a science fiction series received from a media player (e.g., a set-top box) that communicates with social media site 106. The media content may be viewed by Bob within a browser on a desktop, within a smart-TV, or through any other media player 104. Next, in step 404, the system determines a second user who is a "friend" or otherwise within the same social group as Bob, and sends that user (say, Alice), a notification that Bob is watching the that episode of the show. The notification may appear as that shown in FIG. 3, with a thumbnail and a button prompting Alice to join Bob in watching the episode (step 406).

If Alice agrees (via clicking a button or the like), the media content is provided to Alice as well (step 408). At the same time, an interaction region is provided to allow Alice and Bob to chat, send links, and so on with respect to the TV episode as it is playing (step 410). The comments may be time-stamped based on the time at which the comments were made relative to the TV episode. One or more social media streams relating to the media content may also be provided to Alice and Bob while they watch the episode. For example, a Twitter feed relating to that particular episode or characters within the episode (e.g., #drwho, #daleks) may also be provided to Alice and Bob during the episode (step 412). In addition, the system might know that a third user (say, Chad) who is a friend of Alice and/or Bob, may be interested in science fiction, based on, for example, previous status updates, previous purchases, previous media consumption, previous books read, and any other information collected by social media site 106 (step 414). Chad may then be notified that Alice and/or Bob are viewing the episode, allowing him to socially view the episode as well (step 416). If Chad joins the social viewing, or later views the episode, he may be able to scroll back through the interaction stream between Alice and Bob (synched with the media content itself), and view previous interactions regarding the episode.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the legal equivalents.

The invention claimed is:

1. A method for social viewing of media content, the method carried-out utilizing at least one server hosting a social media site and having access to a database storing information pertaining to groups of members of the social media site and common interests shared by the members, the method comprising:
at the server, providing an interaction region associated with a media content region for viewing media content to enable users of at least a set comprising a first and second user to share comments and interact in real-time as media content is viewed by the users for generating an interaction stream wherein the interaction stream comprises: a discussion between users that are members of common groups;
at the server, determining when the first user is viewing media content;
when the first user is viewing media content, utilizing the information stored in the database to enable viewing by a second user in the common group of the first user;
further utilizing the information stored in the database to determine whether the media content corresponds to an interest shared by the first user and the second user;
if determining that the media content corresponds to an interest shared by the first user and the second user, further determining whether the second user desires to view the media content concurrently with the first user;
if further determining that second user desires to view the streaming media content concurrently with the first user, presenting the first user and the second user with the media content along with the interaction region configured to allow the first user and the second user to share comments by interacting in real-time in the interaction region regarding the media content via the interaction stream, wherein the media content is combined at a social media site with shared comments provided by each user in the interaction region and a social media stream related to the media content wherein the related social media stream is determined by analysis of the shared comments in the interaction region of each user wherein each user shares comments while viewing the media content and the social media stream in separate regions wherein the social media stream viewed by each user is dependent at least on each user's preferences; and transmitting a notification to a third user who is a member of the common groups based on the media content, profile information associated with the third member on the social media site, and utilized information stored about the third user wherein the utilized information comprises: previous status updates, previous purchases, previous media consumption, previous books read, and related information collected by the social media site to enable the third member to join a social viewing to view the media content concurrently with the first user and second user, or for viewing later the media content wherein the third user can scroll back through the interaction stream between first and second user which is synched with the media content to view previous interactions regarding a particular media content.

2. The method of claim 1, wherein determining whether the second user desires to view the media content concurrently with the first user comprises:

at the server, generating a notification informing the second user that the first user is currently viewing the media content, the notification including a user interface component offering the second user the capability of viewing the media content simultaneously with the first user; and determining whether the second user desires to view the media content concurrently with the first user based upon interaction of the second user with the user interface component.

3. The method of claim 1, wherein the interaction stream includes time-stamp information indicating times relative to the media content that the comments were shared.

4. The method of claim 1, wherein the media content and the interaction region are rendered together in a web browser window and displayed to the first user while the first user is accessing the social media site.

5. A system for providing social viewing of media content, comprising:

a media player device; and at least one server configured to host a social media site and communicatively coupled to the media player over a network, the server configured to:

provide an interaction region associated with a media content region for viewing the media content to enable users comprising a set of at least a first and second user to share comments and interact in real-time as the media content is viewed by the users for generating an interaction stream;

further determine when the first user is viewing media content by the social media site;

when the first user is viewing media content by the social media site, utilize the information stored in the database to enable viewing by the second user in a common group with the first user;

further utilize the information stored in the database to determine whether the media content corresponds to an interest shared by the first user and the second user;

if determining that the media content corresponds to an interest shared by the first and second users, determine whether the second user desires to view the media content concurrently with the first user;

if determining that second user desires to view the streaming media content concurrently with the first user, present the first and second users with the media content along with the interaction region configured to allow the first user and the second user to share comments by interacting in real-time in the interaction region regarding the media content, wherein the media content presented to the first user is viewed from a media player device, while the media content presented to the second user is obtained from at least one of: a same media content source and the media player device, wherein the media content from the same media source are combined at a social media site with content provided by each user in the interaction region and a social media stream related to the media content wherein the related social media stream is determined by analysis of the shared comments in the interaction region of each user wherein each user shares comments while viewing the media content and the social media stream in separate regions wherein the social media stream viewed by each user is dependent at least on each user's preferences; and transmitting a notification to a third user who is a member of the common groups based on the media content, profile information associated with the third member on the social media site, and utilized information stored about the third user wherein the utilized information at least comprises: previous status updates, previous purchases, previous media consumption, previous books read, and related information collected by the social media site to enable the third member to join a social viewing to view the media content concurrently with the first user and second user, or for viewing later the media content whereby the third user can scroll back through a previous interaction stream between the first and second user which is synched with the media content to view previous interactions between the first and second user regarding a particular media content.

6. The system of claim 5, wherein the server is configured to determine whether the second user desires to view the media content concurrently with the first user by:

generating a notification notifying the second user that the first user is currently viewing the media content, the notification including a user interface component offering the second user the capability of viewing the media content simultaneously with the first user; and determining whether the second user desires to view the media content concurrently with the first user based upon interaction of the second user with the user interface component.

7. The system of claim 5, wherein the interaction stream includes time-stamp information indicating times relative to the media content that the comments were shared.

8. The system of claim 5, wherein the media source is communicatively coupled to the social media site.

9. The method of claim 1, wherein media content is presented to the first user by the social media site via a media player device operated by the first user.

10. The method of claim 9, wherein the media content presented to the second user is obtained from at least one of: a same media content source and the media player device.

11. A method for social viewing of media content, the method carried-out utilizing at least one server hosting a social media site and having access to a database storing information pertaining to groups of members of the social media site and common interests shared by the members, the method comprising:
- at the server, providing an interaction region associated with a media content region for viewing media content to generate commentary from one or more users from interactions between an user and media content viewed;
- at the server, storing the commentary received from a first user while viewing media content displayed from a media player device;
- after the first user has completed viewing the media content, utilizing the information stored in the database for viewing by a second user in a common group with the first user;
- further utilizing the information stored in the database to determine whether the media content corresponds to an interest shared by the first user and the second user;
- if determining that the media content corresponds to an interest shared by the first and second users, further determining whether the second user desires to view the media content and the commentary provided by the first user;
- if further determining that second user desires to view the streaming media content, presenting the second user with the media content and the stored comments received from the first user;
- if further determining that second user desires to view the streaming media content by transmitting a notification to a third user who is a member of the common group based on the media content, profile information associated with the third member on the social media site, and utilized information stored about the third user wherein the utilized information at least comprises: previous status updates, previous purchases, previous media consumption, previous books read, and related information collected by the social media site, enabling the third member to join a social viewing to view the media content concurrently with the first user and second user, or for viewing later the media content whereby the third user can scroll back through a previous interaction stream between the first and second user which is synched with the media content to view previous interactions between the first and second user regarding a particular media content; and
- if the third user in the social viewing is concurrently viewing the media content, the media is combined at a social media site with content provided by each user in the interaction region and a social media stream related to the media content wherein the related social media stream is determined by analysis of the shared comments in the interaction region of each user wherein each user shares comments while viewing the media content and the social media stream in separate regions wherein the social media stream viewed by each user is dependent at least on each user's preferences.

12. The method of claim 11, wherein the media content, when presented to the second user by the social media site, is obtained from at least one of: a same media content source and the media player device.

* * * * *